(12) United States Patent
Lamberton et al.

(10) Patent No.: US 7,058,709 B2
(45) Date of Patent: Jun. 6, 2006

(54) ENABLING SURVEILLANCE OF NETWORK CONNECTED DEVICE

(75) Inventors: Marc Lamberton, Antibes (FR); Eric Levy-Abegnoli, Nice (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 10/035,724

(22) Filed: Nov. 7, 2001

(65) Prior Publication Data

US 2002/0091813 A1 Jul. 11, 2002

(30) Foreign Application Priority Data

Nov. 14, 2000 (EP) .................................. 00480102

(51) Int. Cl.
*G06F 15/173* (2006.01)
(52) U.S. Cl. ...................... 709/224; 713/168; 713/169; 726/26
(58) Field of Classification Search ................ 709/224, 709/223
See application file for complete search history.

(56) References Cited

U.S. PATENT DOCUMENTS

| 5,621,889 | A  | * | 4/1997  | Lermuzeaux et al. ......... 726/22  |
| 6,119,105 | A  |   | 9/2000  | Williams                            |
| 6,244,758 | B1 | * | 6/2001  | Solymar et al. ............ 709/224  |
| 6,249,868 | B1 | * | 6/2001  | Sherman et al. ............ 713/168  |
| 6,256,737 | B1 | * | 7/2001  | Bianco et al. .............. 713/186 |
| 6,269,392 | B1 | * | 7/2001  | Cotichini et al. ........... 709/200 |
| 6,367,016 | B1 | * | 4/2002  | Lambert et al. ............ 713/185  |
| 6,405,318 | B1 | * | 6/2002  | Rowland ..................... 713/200 |
| 6,463,415 | B1 | * | 10/2002 | St. John ..................... 704/273 |
| 6,490,560 | B1 | * | 12/2002 | Ramaswamy et al. ...... 704/250     |
| 6,636,983 | B1 | * | 10/2003 | Levi ............................. 714/4 |

OTHER PUBLICATIONS

'Trusting Mobile User Devices and Security Modules', Pfistzmann et al., IEEE Feb. 1997.*
'Laptop Computer Security', Caveo Technology, Nov. 2001.*
Introduction to Computer Security, Course Catalog, Instruction to Computer security.
Computer Security Products, Inc.; Common Theft Solutions High Security Steel Cable Kits.
Computer security Products, Inc.; Phazer Fiberoptics Alarm System.

(Continued)

*Primary Examiner*—William O. Vaughn, Jr.
*Assistant Examiner*—Greg C. Bengzon
(74) *Attorney, Agent, or Firm*—Thomas A. Beck; Louis Herzberg

(57) ABSTRACT

The invention enables the surveillance of computer-like devices while they are connected to a communications network. This latter includes a Network Surveillance Server (NSS). Upon joining said communications network, a device is first required to log-in to NSS. After which, NSS polls it while connected on the network so that an alarm can be issued, from NSS, to a central surveillance unit, if the device fails responding to polling. Hence, prior to leaving the communications network, the computer-like device is also required to log-out to NSS. Thus, as long as it is connected to the communications network, the computer-like device is watched.

11 Claims, 3 Drawing Sheets

OTHER PUBLICATIONS

Continental Resources: Eyewitness; Help for Stolen Laptops, CyberAngel offers password protection and e track down stolen laptops.

Security Administration: Security News; Computer Crime; Source: Computing Canada-Jul. 4, 1996.

Computer Security Administration: Security News; Notebook Computer Theft at Airports.

Secrutiy Products; ALARMS.

\* cited by examiner

ENABLING SURVEILLANCE OF NETWORK CONNECTED DEVICE

FIELD OF THE INVENTION

The present invention relates to theft prevention of personal computers and other similar computer-like devices that are easily removable. It is more particularly concerned with those devices that normally connect to a network e.g., a LAN (Local Area Network), while in use.

BACKGROUND OF THE INVENTION

Laptop computers and other similar computer-like devices are getting smaller, lighter and more powerful. What makes them appealing to business people also attracts criminals. If there is nothing as frustrating as losing a word processing document or a spreadsheet file, losing a whole computer to theft and its invaluable content such as highly confidential and sensitive business-critical data may be devastating to an organization. In all surveys about computer crime conducted e.g., by insurance companies or some specialized governmental agencies, large companies and organizations that participate to these surveys, are bound to report losses that must be expressed in million of dollars from laptop theft alone. While the trend is a significant increase from year to year analysts agree to say this is just the tip of the iceberg as most laptop computer thefts go actually unreported. Most stolen equipment is never recovered. Thus, vendors of computer security products have responded with a slew of gadgets to deter laptop theft. As far aso physical security is concerned there are many devices available on the market for preventing the theft of equipment. These devices include, locks, cabinets, cables, alarms and deterrent products such as warning labels and equipment used to mark components. If alarms do not prevent the theft of equipment they usually act as a deterrent as well as to alert people in the vicinity or a central location that a device has been removed from its usual location. Alarms can either be installed inside the equipment or on the outside. These devices usually emit loud, piercing sounds if the equipment is moved or if the alarm is tampered with. Some alarms are equipped with keys to enable authorized personnel to deactivate them. Apart from the locks that most personal computers come equipped with, there are other devices that can be used to prevent unauthorized removal of the equipment. Many use either adhesive-mounted pads or metal brackets to fasten the computer and other equipment to a desk or table top. These devices are usually manufactured out of hardened steel. Some use special adhesives and others use bolts. Anchors and cables enable the anchoring of devices to desks. Cables are probably the most common physical security devices and usually the cheapest. They also tend to be the most flexible. Usually, steel cables are passed through metal rings that are attached to the equipment and a desk or table. Although cables prevent an individual from quickly walking away with a piece of equipment, they can be cut, although not with ordinary tools. If all of this is relatively efficient, if indeed properly enforced, it is far to be convenient. Attaching its laptop through a cable to an immovable object every time one moves in its working place is definitively very inconvenient and tend to be often dismissed hence, not really solving the problem.

On the other hand laptops used in company and organization offices and workplaces (and even at home which tend to become another workplace) are most often, not to say always, permanently connected to some sort of local area network (wired or wireless) or has a permanent link to an Intranet or an Internet service provider. Because such links are vital to conduct their work and business all those having to use portable computers and similar devices never miss in practice to first connect to their network e.g., to download their mail or to access some sort of data bases to get updated on their business. Hence, the act of connecting to a network is willingly done since it is the necessary step to obtaining the news and information, and to be kept constantly updated, about its everyday activity.

SUMMARY OF THE INVENTION

Thus, it is an aspect of the invention to enable surveillance of a network connected device from the network.

It is another aspect of the invention to issue an alarm to a central surveillance unit whenever a laptop or similar computer-like device is, without notice, disconnected from a network.

It is yet another aspect of the invention to define a log in and log out procedure to permit that a removable computer-like device be reliability monitored while in use and connected to a network.

Further aspects, features and advantages of the present invention will become apparent to the ones skilled in the art upon examination of the following description in reference to the accompanying drawings. It is intended that any additional advantages be incorporated herein.

Thus the invention provides, methods and system for enabling the surveillance of computer-like devices connected to a communications network. In an example embodiment, a communications network includes a Network Surveillance Server (NSS).

Upon joining the communications network, a computer-like device is required to log-in to NSS. Then, NSS polls the device connected on the communications network so that an alarm can be issued from NSS to a central surveillance unit, when the computer-like device fails responding to polling. Prior to leaving the communications network, the computer-like device logs-out from NSS. This allows the computer-like devices to be watched as long as they stay connected onto the communications network

BRIEF DESCRIPTION OF THE DRAWINGS

These and other aspects, features, and advantages of the present invention will become apparent upon further consideration of the following detailed description of the invention when read in conjunction with the drawing figures, in which.

DETAIL DESCRIPTION OF THE INVENTION

Figure 1:
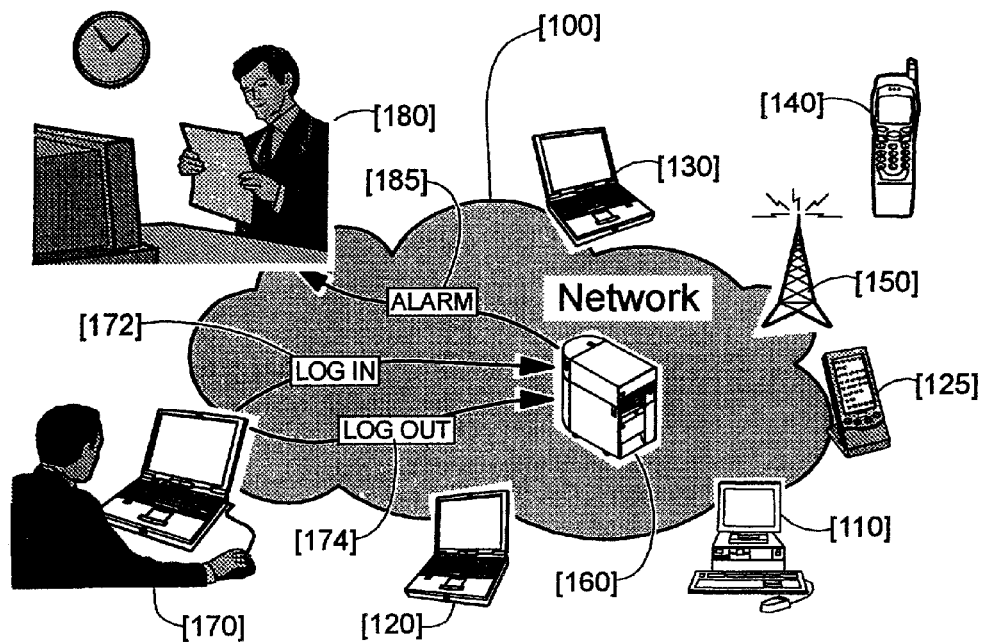
FIG. 1 illustrates an example of a communications network including a network surveillance server (NSS) per the invention.

FIG. 1 illustrates an example context in which the present invention applies. On some sort of network [100] e.g., an IP (Internet protocol) LAN (Local Area Network) i.e., operated under the TCP/IP suite of protocols, computer-like pieces of equipment are permanently connected while in use. This may include regular desktop PC's as [110], and much frequently in recent years, laptop computers such as [120, 130] and other similar portable devices like a palmtop [125]. Connection to a network as [100] may as well be achieved through a wireless connection [150] so as to reach e.g., a portable phone [140] running the Wireless Application Protocol (WAP) that permits to get access to Internet applications. Alternatively, the whole network may be a wireless network such as a wireless LAN. Then, the invention adds a compulsory service associated to the network [100] and operated, for example, from a network connected server [160] to which any new user must log in [172] whenever it connects. Conversely, when user [170] wants to leave, prior to disconnecting from the network, it must log out [174] first. Hence, this procedure authorizes the surveillance of all connected pieces of equipment connected at some point of time to the network. This is further discussed in following figure. If one device is disconnected, without having normally log out first, an alarm [185] to a central surveillance unit [180] can thus be issued so as all appropriate actions can be taken.

Figure 2:
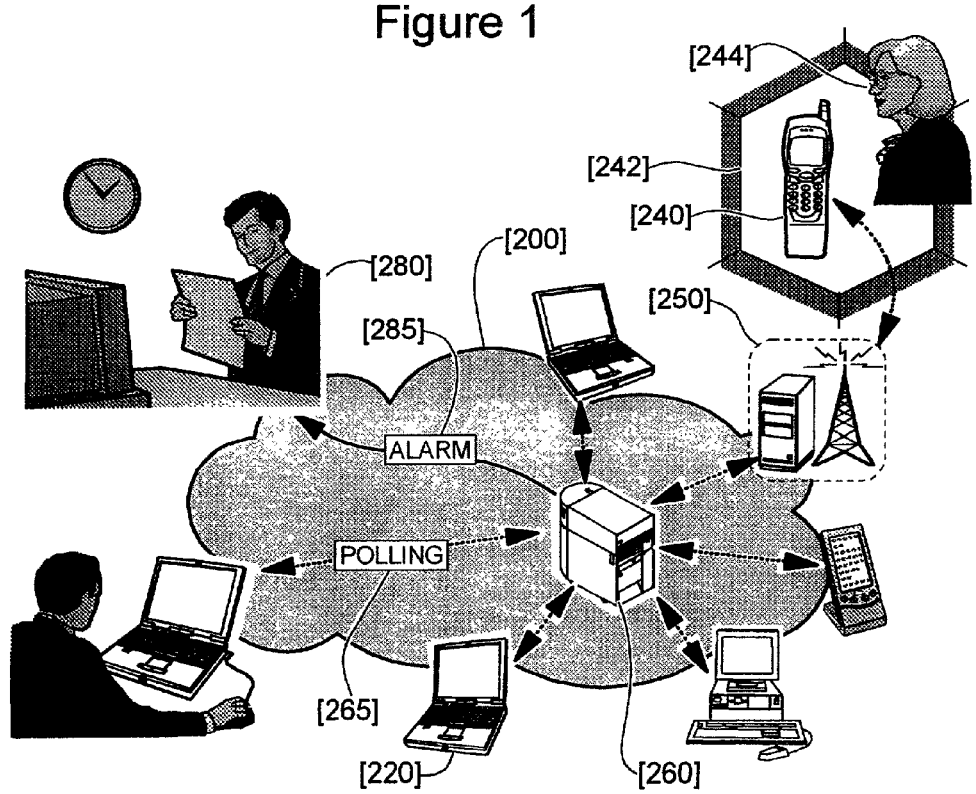
FIG. 2 illustrates the monitoring of devices normally connected to the network at any moment FIG. 3 describes the steps of an example of a method according to the invention.

FIG. 2 illustrates the monitoring of devices normally connected to the network [200] at any moment. This is done from the server in charge of the surveillance service [260]. This latter polls regularly all registered connected devices such as [220]. Depending on the type of network this may have to be accomplished through the activation of various mechanisms. Over an IP network, this can simply be done by issuing a so-called 'PING' command to the device that must be polled i.e., by performing an ICMP (Internet Control Message Protocol) echo request, echo reply test e.g., [265]. The polled device, if still connected, is due to respond. An alternate method for an IP network consists in activating the address resolution protocol (ARP) from the network surveillance server (NSS) [260] so as it can make sure that the polled device is still connected since this latter is due to respond with its Media Access Control (MAC) address which is unique. Thus, the surveillance server manages to interrogate each connected device and obtain a response from it, e.g., as shown in [265] thus, proving that corresponding device [220] is indeed still connected.

As far as mobile devices and wireless networks are concerned [240] the question for NSS is rather to understand if device is still in proper hands since this kind of device does not actually physically disconnect from a network (nothing is unplugged) as with a wired LAN. Monitoring may include various methods like checking if mobile stays within a communication cell [242], or a group of cells, it is normally expected to roam in. Also, such a mobile device must identify itself through a portal [250] so, an unexpected use of portal or use of a different portal may become the indication of something that needs to be further checked by NSS before issuing an alarm. And, for those of the portable or mobile devices that are not limited to data only transmission but are normally equipped for transmitting voice and even video too, NSS may house the proper technology to perform biometric checking over the individual [244] actually using the device. Especially, voice intonation can be checked and used as a strong authentication of who is actually using the device.

More generally the more sophisticated of the NSS's, per the invention, are devised to not only check if a device is, when applicable, actually physically connected to the network, from which surveillance is exercised, but also to check all sorts of behaving and biometric data about those that are connected and which can be easily acquired through the network itself, like voice and typing speed on a computer keyboard, so as alarms [285] can be timely reported to the surveillance unit [280]. This way of checking, beyond a simple physical disconnection from network, may require to implement further checking by NSS not to trigger false alarms like having to first call back the registered owner [244] of a mobile device for further checking.

As far as IP networks are concerned the surveillance service as disclosed by the invention may preferably be implemented in a similar way as the Dynamic Host Configuration Protocol (DHCP) of the Internet Engineering Task Force (IETF) as described in RFC 2131, March 1997. While DHCP purpose is to enable individual computers on an IP network to extract their configurations from a server (the 'DHCP' server) that has no exact information about the individual computer that wants to connect until it request this information from the computer itself. At which time this latter is attributed a dynamic IP address for the time of a DHCP lease. Similarly, the invention introduces a NSS or Network Surveillance Server, in charge of watching the computers and devices that desire to connect to the network however, requiring a log in and log out procedure to the network so as they can be watched while connected.

Figure 3:
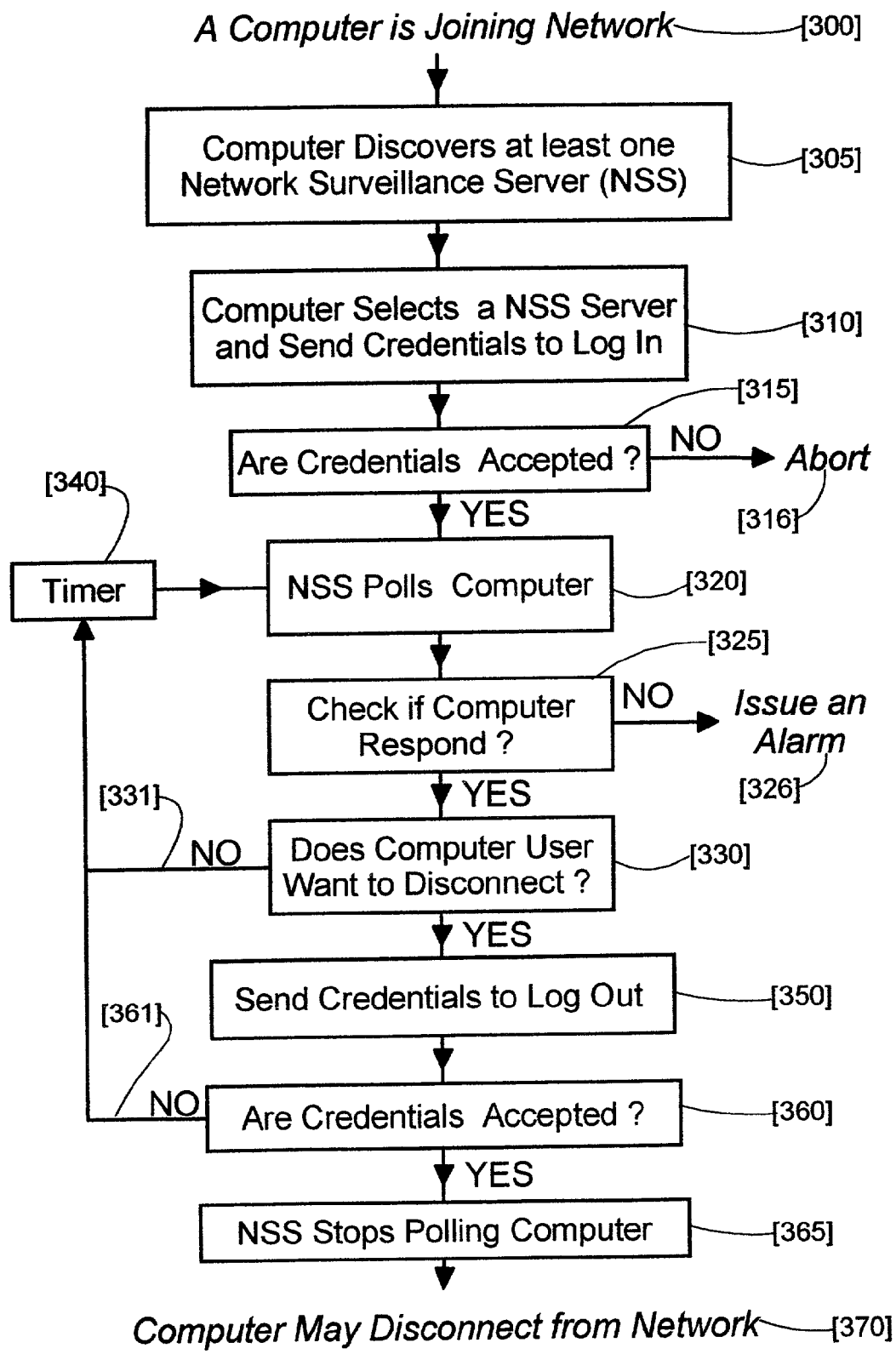

FIG. 3 depicts the steps of an example of a monitoring method according to the present invention. It starts when a computer or similar device is joining [300] the network for example by connecting on an Ethernet or Token Ring Local Area Network (LAN). Then, joining computer manages to discover [305] all Network Surveillance Server (NSS) present within the network. This is achieved by methods and techniques known from the art and which depends mainly on the type of network considered. If more than one NSS exist computer must select one NSS server so as it can attempt to log in to it by sending proper credentials [310]. If computer credentials are not accepted log in process is aborted [316]. However, if accepted, NSS may start polling the computer [320]. If computer is no longer found, which is checked at step [325], an alarm is normally issued [326]. This particular step [325] may be more sophisticated than just issuing an alarm at first non responded interrogation. Among numerous possibilities, to be more flexible, the alarm could only have to be issued e.g., after a certain number of interrogations or after some time has elapsed. If found, as normally expected, the next step is to check if user of the computer has requested to disconnect [330] (wants to log out). If not, polling may go on [331] so as to keep watching the device while connected to the network. Polling is preferably done at regular intervals as set with a timer [340] although any other method can be used as well such as random interval polling or polling rate adjustable depending on the number of connected devices and activity observed over the network. If, as checked at step [330], computer user wants however to disconnect it must prove to NSS that it is entitled to do so by providing the proper credentials [350]. If credentials are accepted, the normal case, NSS stops polling the computer [365] so it can be safely disconnected from the network [370]. However, if credentials were not accepted polling goes on [361] so as, if disconnected, this eventually result in the sending of an alarm [326].

It is worth mentioning here that 'credentials' broadly refers to any method, known from the art, of authenticating a legitimate registered user. This includes simple methods requiring to sign on and sign off with a password or with a Personal Identification Number (PIN) to much more sophisticated ones e.g., implying the possession and the use of a token or smart card and/or the recognition of biometric data such as finger prints through an appropriate reading device.

Also, as already mentioned, the term 'computer' used for illustrating the monitoring method according to the invention must be broadly interpreted as any computer-like device, possibly also handling voice and video, capable of connecting directly or indirectly to a network housing a NSS.

Figure 4:
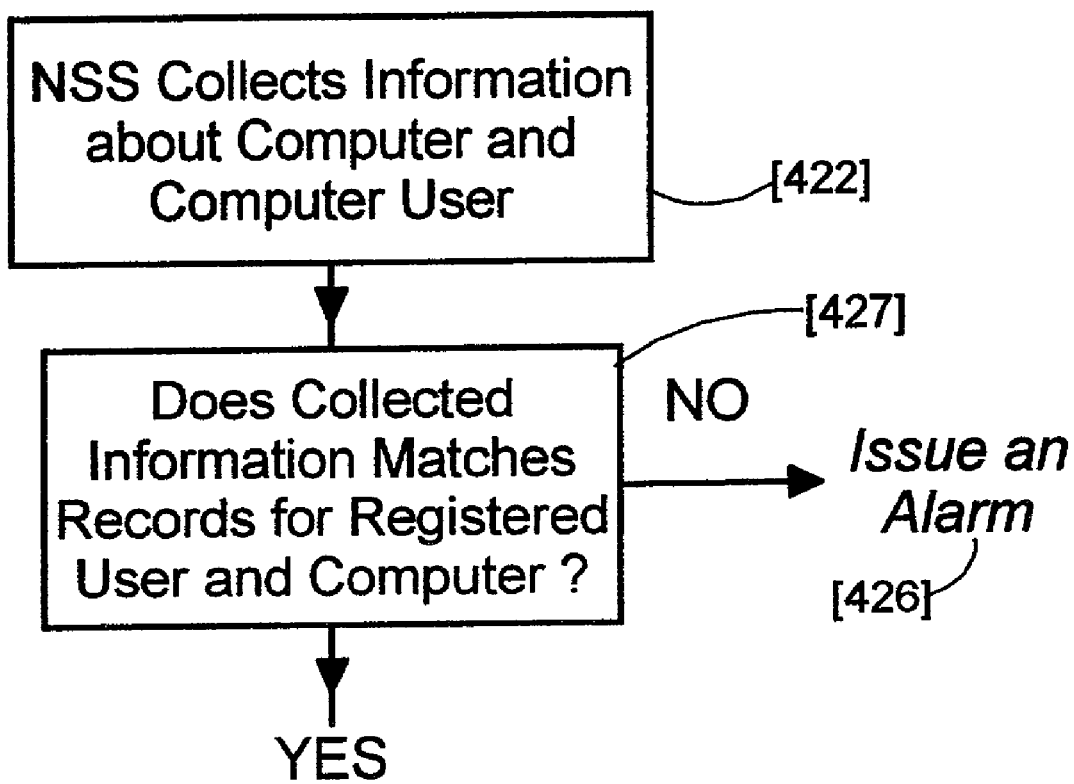
FIG. 4 shows alternate and/or supplementary steps to the method of FIG. 3 of the invention, wherein information is collected about the computer-like devices and their users and compared to corresponding records in NSS.

FIG. 4 shows alternate or supplementary steps of the monitoring method described in FIG. 3 thus, replacing or executed in complement to steps [320, 325]. As already discussed in FIG. 2, NSS may also check data it collects about the connected device and its user [422]. This ranges from simple geographic location from where a mobile device is calling [242], to the portal [250] through which it connects, plus some biometric data about at least one authorized user of the device such the typing speed over a key board of a laptop or the voice intonation for a cellular phone or a voice-enabled computer. Hence, the data thus collected through the network, can be compared [427] to what is recorded in NSS for the alleged device and registered user(s) so that, if not matching, an alarm can be issued as well.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising:
   enabling surveillance of a computer device connected to a communications network including a Network Surveillance Server (NSS), said network including the steps of:
   upon joining said communications network, said computer device logging-in to said NSS; discovering at least one said NSS within said communications network; selecting one of said at least one NSS to perform the surveillance of said computer device; sending credentials to said selected NSS; thereby, if accepted by said selected NSS; completing login; however, if not accepted; aborting log-in;
   said NSS polling said computer device while connected on said communications network, said polling step including said NSS determining if said computer device responds, and if so, collecting information about said computer device and a registered user of said computer device, and comparing if said collected information matches records, in said NSS, about said computer device and said registered user, said collecting step and said comparing step being performed on top of said polling step and said checking step; said NSS issuing an alarm, to a central surveillance unit if said computer device fails responding to polling;
   wherein said collected information about said user includes a typing speed over a keyboard or a voice intonation; and
   wherein said collected information about said computer device includes a current geographic location and an identification of a portal through which said communications network is accessed;
   prior to leaving said communications network, when it is desired to leave said communications network, said computer device sending credentials to said selected NSS, wherein said credentials include knowing a personal identification number (PIN); knowing a password; and possessing a token or a smartcard; thereby, if log-out is accepted by said NSS stops polling, said computer device thus completing log-out; however, if log-out is not accepted, said NSS keeps polling, said computer device thus failing to complete log-out; said computer device lagging-out from said NSS; and
   allowing said computer device to be watched by NSS while being connected to said communications network.

2. The method according to claim 1, wherein there are a plurality of said NSS present in said communications network.

3. The method according to claim 1, wherein said communications network is an IP network and said polling step utilizes the IP 'PING' command.

4. The method according to claim 1, wherein said communications network is an TP network and said polling step utilizes the IP Address Resolution Protocol (ARP).

5. The method according to claim 1, wherein said computer device is a mobile device.

6. The method according to claim 1, wherein said computer device is voice enabled.

7. A system for enabling the surveillance of computer devices connected onto a network, comprising means adapted for carrying out the method according to claim 1.

8. A computer readable medium comprising instructions for carrying out the method according to claim 1.

9. An article of manufacture comprising a computer usable medium having computer readable program code means embodied for causing enablement of surveillance of a computer device connected to a communications network, the computer readable program code means in said article of manufacture comprising computer readable program code means for causing a computer to effect the steps of claim 1.

10. A program storage device readable by machine, tangibly embodying a program of instructions executable by the machine to perform method steps for enabling surveillance of a computer device connected to a communications network, said method steps comprising the steps of claim 1.

11. A computer program product comprising a computer usable medium having computer readable program code means embodied therein for causing a system for causing enablement of surveillance of a computer device connected to a communications network, the computer readable program code means in said computer program product comprising computer readable program code means for causing a computer to effect the functions of claim 7.

\* \* \* \* \*